United States Patent [19]

Hatlestad et al.

[11] Patent Number: 5,661,817

[45] Date of Patent: Aug. 26, 1997

[54] SINGLE CHARGE-COUPLED-DEVICE CAMERA FOR DETECTION AND DIFFERENTIATION OF DESIRED OBJECTS FROM UNDESIRED OBJECTS

[75] Inventors: John David Hatlestad, Burnsville; Gerald Francis Sauter, Eagan, both of Minn.

[73] Assignee: Lockheed Martin Corporation, Bethesda, Md.

[21] Appl. No.: 505,550

[22] Filed: Jul. 21, 1995

[51] Int. Cl.[6] .............................. G06K 9/00; H04N 7/18; H04N 9/47; H04N 5/33

[52] U.S. Cl. .................... 382/110; 348/144; 348/164; 348/273; 382/164

[58] Field of Search ........................... 382/110, 162–165; 348/33, 34, 144, 164, 290, 291, 266, 143, 148, 273

[56] References Cited

U.S. PATENT DOCUMENTS

| | | | |
|---|---|---|---|
| 3,869,705 | 3/1975 | Woywood et al. | 348/144 |
| 4,015,366 | 4/1977 | Hall, III | 382/110 |
| 4,227,211 | 10/1980 | Disbrow | 348/144 |
| 4,718,089 | 1/1988 | Hayashi et al. | 382/164 |
| 5,132,802 | 7/1992 | Osthues et al. | 358/213.28 |
| 5,353,053 | 10/1994 | Nishioka et al. | 348/164 |
| 5,555,464 | 9/1996 | Hatlestad | 348/266 |

OTHER PUBLICATIONS

Franz, E, Gebhardt, M.R., Unklesbay, K.B., "The Use of Local Spectral Properties of Leaves as an Aid for Identifying Weed Seedlings in Digital Images" *Transactions of the ASAE*, Mar.–Apr. 1991, vol. 34(2), pp. 682–687.

Nitsch, B.B., Von Bargen, K., Meyer, G.E., "Visible and Near Infrared Plant, Soil and Crop Residue Reflectivity for Weed Sensor Design," ASAE Presentation, Jun. 23–26, 1991, Paper No. 913006.

*Primary Examiner*—Leo Boudreau
*Assistant Examiner*—Bipin Shalwala
*Attorney, Agent, or Firm*—Glenn W. Bowen

[57] ABSTRACT

A conventional color charge-coupled-device (CCD) camera without a near infrared blocking filter is used to detect desired vegetation from undesired vegetation and other background. This detection technique relies on the fact that near-infrared (NIR) wavelengths are received by CCD cameras in predetermined frequency bands. This provides output signals from the green and blue pixels of the CCD camera which are approximately equal in interests to the intensity of the infrared portion of the signal provided by the red pixels. A filter is placed between a target area and the CCD camera to restrict the light received by the camera to a bandwidth (approximately from wavelengths of 600–1400 nm), which allows the NIR signal component of the green or blue pixels in this bandwidth to be compared by a signal processing device to the NIR plus R output of the red pixels. In this bandwidth the intensity of the output from the red pixels due to red light from the target area is maximized. Therefore, a signal processing device can utilize signals from the red, green and blue pixels to detect plants and crops in an area of undesired vegetation.

2 Claims, 3 Drawing Sheets

SINGLE CHARGE-COUPLED-DEVICE CAMERA FOR DETECTION AND DIFFERENTIATION OF DESIRED OBJECTS FROM UNDESIRED OBJECTS

BACKGROUND OF THE INVENTION

1. Field of the Invention

This invention is related to the use of a charge-coupled-device (CCD) camera for the detection and differentiation of desired objects from undesired backgrounds which may be complex. The invention is particularly useful for detecting crops from undesired vegetation.

2. Description of the Prior Art

The difficulty of utilizing infrared (IR) imaging devices for the detection of cold targets is recognized in U.S. Pat. No. 5,132,802 which issued Jul. 21, 1992 to Osthues et al., entitled "High Contrast Image Apparatus Employing Optical Filters to Cause Each Image Pick-Up Element to have its Maximum Sensitivity in a Different Spectral Range." The apparatus of the Osthues et al. patent is described in the embodiment which is directed to the detection of military objects which may be surrounded by natural vegetation and may be camouflaged. The system of the Osthues et al. patent utilizes two image pick-ups which are selected to have two different wavelength ranges. In this patent the reflection from the vegetation is considered to be clutter. One of the wavelength ranges is selected so that the reflection characteristics of the object and of the surrounding natural vegetation are as similar as possible. The second wavelength is selected so that there is the greatest possible difference between the reflection behavior of the object to be detected and that of the vegetation.

Two separate CCD cameras are utilized in the Osthues et al. patent so that each camera receives and operates on one of the two wavelengths. The first wavelength, which is selected so that the characteristics of the object and the natural vegetation are as similar as possible, lies in the near infrared (NIR) range. This wavelength is equal to, or greater than, the range of 0.7 μm to 2 μm. The second wavelength, which is utilized to distinguish the background of the object, lies between 0.2 μm and 0.6 μm.

The Osthues et al. patent shows two separate embodiments for implementation of the optical device of this patent application. One of the implementations shows the use of two separate lens and filter combinations, each one of which is used to convey its image to a separate CCD camera. The second embodiment utilizes a single lens and two CCD cameras which are placed so that one of the camera devices is positioned horizontally and the other is positioned vertically or at right angles. The light from the lens is then directed onto an optical beam-splitter. The beam-splitter then splits the beam and directs a portion of it onto a filter providing the first wavelength to one of the cameras and a different filter for providing the second wavelength to the other camera.

It is well known that the ratio of the reflection of light from the near-infrared (NIR) and the red (R) portions of the spectrum is a reliable detector of living plants against various backgrounds of soil and crop residue. For example, this information is conveyed in the article entitled "Visible and Near-Infrared Plant, Soil, and Crop Residue Reflectivity of Weed Sensor Design" by B. Nitsch et al. in the ASAE Proceedings of the 1991 International Summer Meeting at Albuquerque, N. Mex., on Jun. 23–26, 1991, Paper No. 913006. This ratio of NIR/R signal strength is called in this paper the "vegetative index." An alternative ratio which may be used is the ratio of NIR−R/NIR+R, which is termed the normalized difference ratio, is described in this same article. The prior art indicates that the ratio of NIR/R may be utilized where the NIR is obtained from a portion of the spectrum from approximately 750 nm to 850 nm and the red is obtained from a region around 600 nm to 650 nm to differentiate plant growth from background soil and crop residue. Bandpass filters may be placed in front of photo-detectors to obtain the signals from the various spectral regions. This works well when the detection of living plants is the only requirement. However, when weed species must also be detected, identified and differentiated from the living crops, imaging techniques must be used. Two black and white CCD cameras with two separate filters could be used, but this can be a costly solution. In addition to the additional cost, this creates an alignment problem, especially on close objects since parallax errors will change the image alignment as a function of the distance of the object.

Another article in the *Transactions of the ASAE* (American Society of Agricultural Engineers) is entitled "The Use of Local Spectral Properties of Leaves as an Aid for Identifying Weed Seedlings and Digital Images" by E. Franz, et al. It appeared in Volume 34(2), March–April 1991. This article also discusses the use of NIR reflectance for plant discrimination and the use of a black and white CCD camera and photographic filters to extract spectral data from vegetative and non-vegetative regions.

In order to be commercially feasible for agricultural applications, the utilization of expensive cameras and optical systems must be minimized. In addition, a system which utilizes more than one CCD camera tends to be bulky and unmanageable. In the preferred embodiment of the invention, it is described for agricultural applications in which the sensor is intended to be mounted on a slow-moving agricultural vehicle.

SUMMARY OF THE INVENTION

A single color CCD camera having red, green and blue pixels is utilized to measure red (R) and near-infrared (NIR) reflected signals from objects that are illuminated by artificial light (which may be laser light) or natural light, or both. These signals are used to derive R and NIR reflected signal strength relationships that are useful for distinguishing useful crops and plants from undesired vegetation and weeds. If the camera has an infrared filter that would otherwise block infrared and near infrared signals from impinging upon the red, green and blue responsive pixels, it is removed. A filter is then placed over a typical color CCD camera, such as a Texas Instrument TC 244 color CCD camera, which allows light of a wavelength from approximately 600 nm to approximately 1000 nm to pass into the camera. According to the response of the CCD camera, the upper limit response of the filter may be as high as 1400 nm. This filter, because of bandwidth range, passes NIR wavelength light, but blocks blue and green wavelength light from being sensed by the camera. Red light which has wavelength of approximately 622–770 nm, however, may readily pass through this filter to impinge on the red pixels. Green light (which has a wavelength of approximately 492–577 nm) and blue light (which has a wavelength of approximately 455–492 nm) will be blocked from passing through to the green and blue pixels, respectively. NIR light of a wavelength approximately 770–1000 nm when it passes through this filter will cause a response of both the green and the blue pixels, either, or both, of which may be utilized to provide an approximate NIR response. The NIR response in conjunction with the R response from the red pixels is used to distinguish objects that are desired to be detected from those that are not in the target area.

BRIEF DESCRIPTION OF THE DRAWINGS

The invention is shown by reference to.

TECHNICAL DESCRIPTION OF THE INVENTION

Figure 1:
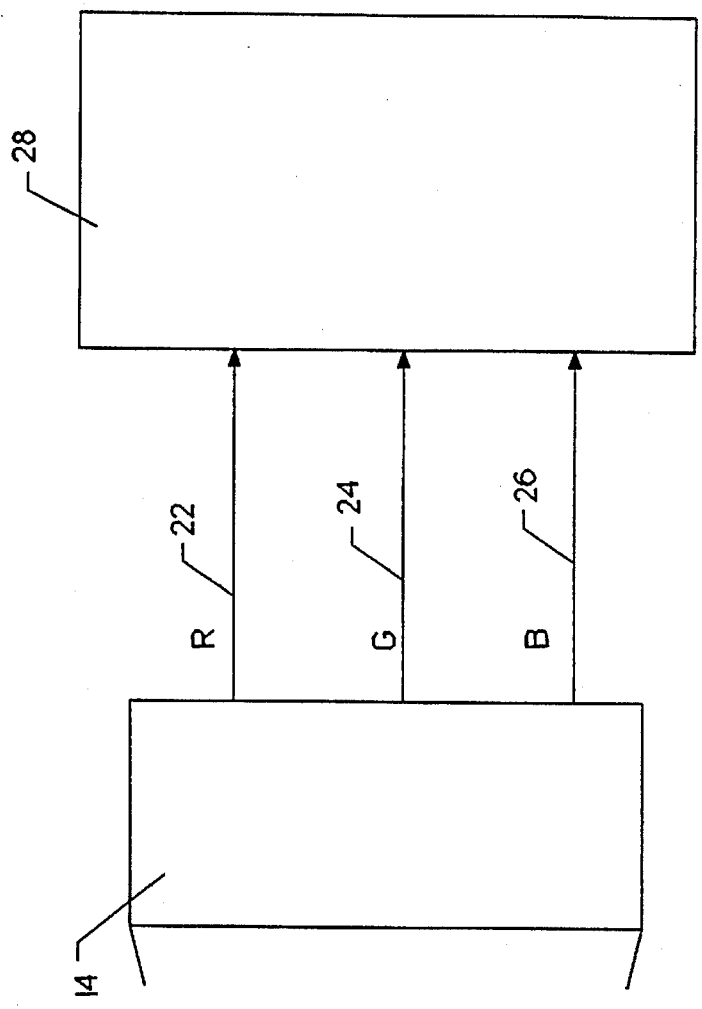
FIG. 1 which is a block diagram of the invention that illustrates a single, color CCD camera which receives an image from an imaging area and provides color signals to a signal processing apparatus.
Figure 2:
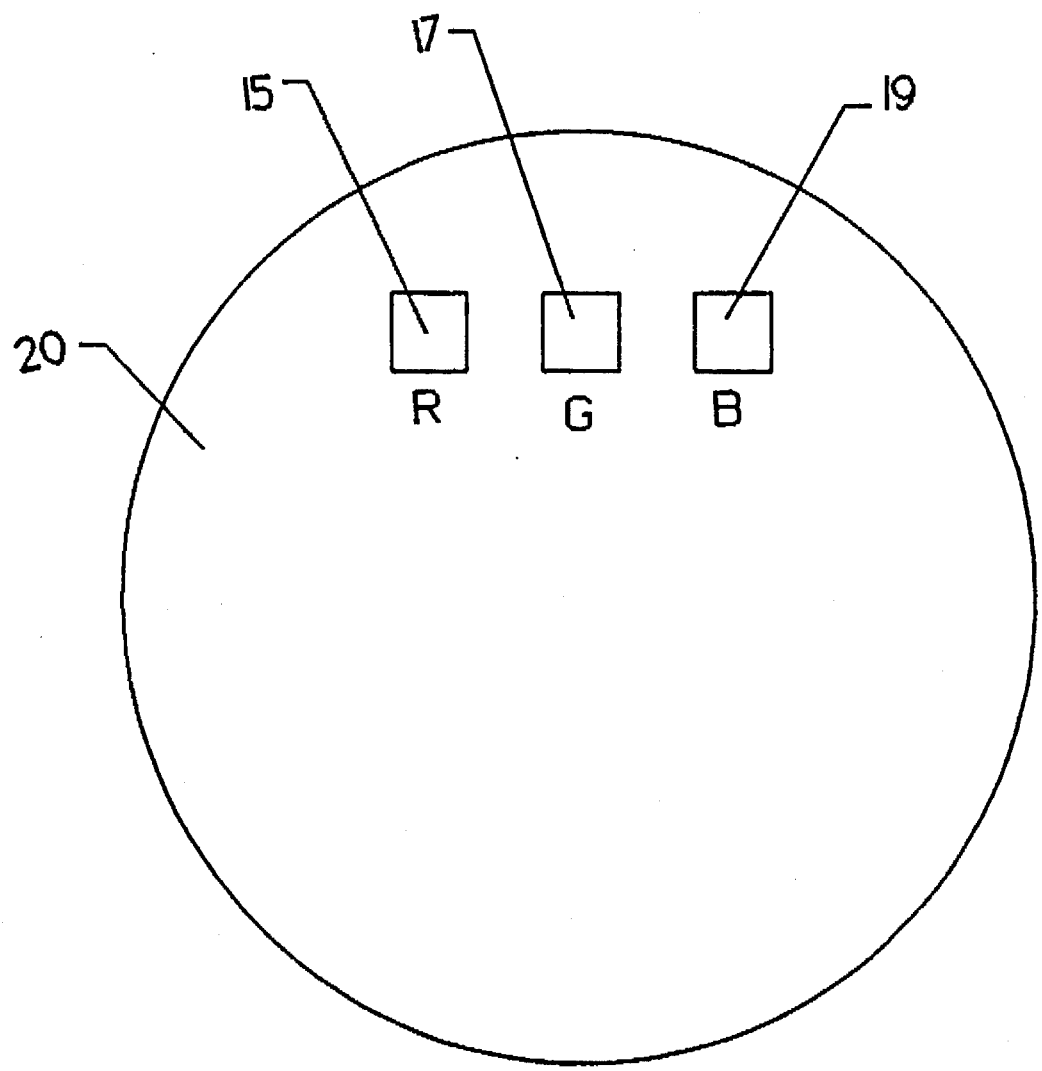
FIG. 2 is a front view of a display which illustrates red, green and blue pixels.

The invention is described by reference to the embodiment of FIG. 1 in which a sensing system 10 includes a single color CCD camera 14. The CCD camera is employed to obtain optical information from an area which contains crops or plants of a desired nature in order to distinguish them from undesired weeds and other background objects. In order to differentiate between the plants or crops and a non-plant background, the vegetative index of NIR/R signal strength may be employed. When area 12 that contains the weeds and crops is illuminated by a beam from a light source (not shown) which is possibly natural sunlight or artificial light, including light from lasers, it will be reflected from the area and directed to the CCD camera 14.

The CCD camera 14 is a typical one which is constructed with a multitude of interspersed red, green and blue pixels which cover the entire receptive surface 20 of the CCD array. Red pixel 15, a green pixel 17 and a blue pixel 19 are shown on the face of the receptive surface as representative of the multitude of color pixels that comprise the receptive surface 20. The CCD camera provides separate red, green and blue signals from the red, green and blue CCD pixels on the red signal line 22, the green signal line 24 and the blue signal line 26, respectively. CCD cameras typically use an infrared blocking filter to block infrared light from impinging on the respective surface. This filter is removed if it exists in the CCD camera, and then in addition to red, green and blue colors, the signals on the lines 22, 24 and 26 are also responsive to near-infrared wavelengths.

Figure 3:
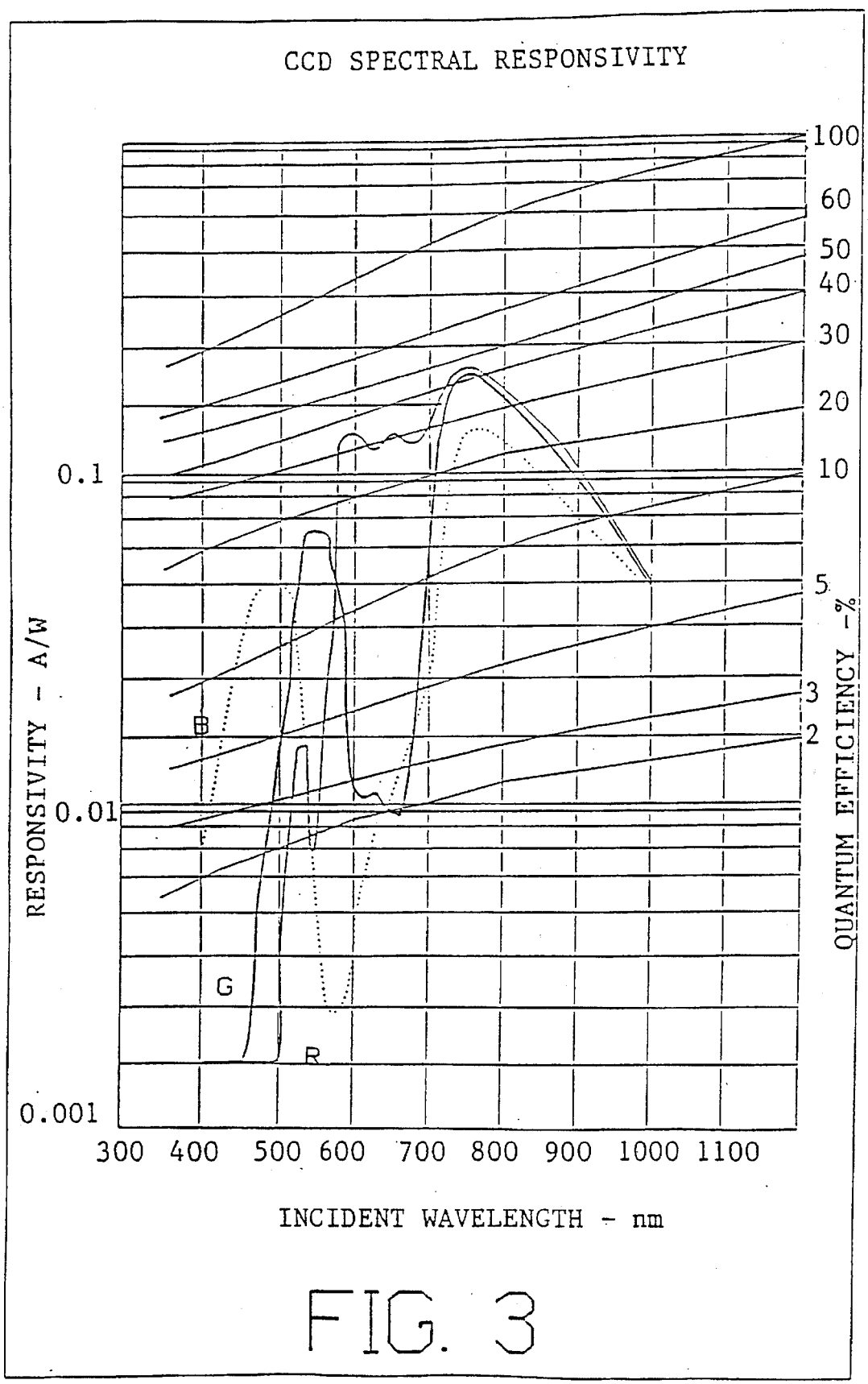
FIG. 3 is a graph that shows the spectral response of a typical color CCD camera which does not have a near infrared blocking filter.

The spectral response of a typical color CCD chip is shown in FIG. 3 for incident wavelengths between 400–1000 nm. The graph of FIG. 3 is for a Texas Instrument TC 244 CCD chip that does not have an internal filter to block near infrared light from impinging on the red, green and blue pixels of the camera. From this graph it is seen that at a wavelength of approximately 750 nm, the red pixels 15, green pixels 17 and the blue pixels 19 of the display surface 20 are relatively equal, and they remain so to a wavelength of about 1000 nm. This is due to the fact that the responses of all of the pixels to NIR radiation are approximately equal. The invention takes advantage of this fact by placing a passband filter 23 between the target area 12 and receptive surface 20 of the CCD camera. The filter 23 for the illustrated camera passes incident light of wavelength bands between approximately 600–1400 nm for typical color CCD cameras. For the camera that uses the Texas Instrument TC 244 CCD chip, the passband may include wavelengths greater than 1400 nm.

The green and blue pixels of present commercially available CCD cameras respond to NIR wavelengths in approximately the 770–1000 nm wavelength range. The NIR information that is obtained in this manner then may be represented by either the green (G) signal on the line 24 or the blue (B) signal on the line 26 as an approximation of the NIR signal, in accordance with the spectral response of the particular CCD camera employed. The red (R) signal is obtained by using the response of the red pixels 15, which provide both red and infrared information, while the signals from green pixels respond substantially the same as the red pixels to the infrared signal. Red wavelengths are between approximately 622 and 770 nm. Green wavelengths are between approximately 492 and 577 nm. Blue wavelengths are between approximately 455 and 492 nm. Near-infrared wavelengths are approximately from 770–1400 nm.

If the (G) signals from the green pixels are subtracted from the (R) signals from the red pixels, the result, therefore, is substantially a signal containing red information. The signal processing device 28 which receives the red, green and blue signals from the camera 14 is, therefore, required to utilize only two of the three signals that are generated on the lines 22, 24 and 26. The signal processing device 28 thereby provides a vegetative index which is useful in differentiating between useful plants and undesirable ones by conventional signal multiplication and division techniques. Thus, the NIR/R ratio is approximated to a satisfactory extent by utilizing a G/(R-G) signal or, alternately, a B/(R-B) signal depending on the typical characteristics of the camera, as represented in FIG. 3. In place of the vegetative index, NIR/R, a normal difference ratio signal $$\frac{NIR - R}{NIR + R}$$

may be developed. In the invention the images that are received are always registered and parallax error is not a problem. The use of a single standard color CCD camera appreciably provides high resolution and reduces the cost of an imaging system for detection and differentiation of desirable and undesirable vegetation.

The invention may be used for other applications, for example, the detection of military objects surrounded by vegetation, as in the Osthues patent. It also may be used for the long distance detection of vegetation, such as for the detection of vegetation on distant planets by means of space probe where the size of the optical system must be minimized.

What is claimed is:

1. A method of detecting objects in a target area which is illuminated by a light source which causes light reflection from the target area comprising:

a) examining red, green and blue pixel group responses of a color CCD camera which is constructed without a filter to block near infrared light from impinging on said pixel groups in order to determine a bandwidth of wavelengths over which the red pixel group provides a red (R) response which peaks in said bandwidth and a near infrared (NIR) response, wherein the CCD is constructed so that at least one of said green and blue pixel groups provides a response in said bandwidth which is approximately equal to said predetermined NIR response of said red pixel group, b) placing a filter between said target area and said CCD camera which limits the light from said target area that impinges on said pixel groups to approximately said bandwidth, c) developing signals in said CCD camera such that a first signal which is representative of the response of said red pixel group and a second signal is representative of the response of said at least one of said green or blue pixel groups, d) subtracting said second signal from said first signal to provide an R signal, and e) utilizing combinations of said R signal and said second signal to identify objects in said target area.

2. A sensing system for detecting objects in a target area which is illuminated by a light source which causes light reflection from the target area comprising:

a) a CCD camera comprising an image area comprising red, green and blue light-responsive pixel groups which is not constructed to block near infrared light from impinging on said pixel groups and which is capable of transmitting a red output signal representative of said red pixel group and at least a green or blue output signal which if provided are representative of the NIR response of said associated green or blue pixel groups such that said red pixel group provides a red (R) response which peaks in said bandwidth and a near infrared (NIR) response, and said CCD camera is constructed so that at least one of said green and blue pixel groups provides a response which is approximately equal to said NIR response of said red pixel group, b) a filter positioned between said target area and said CCD camera which limits the light from said target area that impinges on said pixel groups to a bandwidth of wavelengths such that said red pixel group provides a red (R) response which peaks in said bandwidth and a near infrared (NIR) response, and said CCD camera is constructed so that at least one of said green and blue pixel groups provides a response which is approximately equal to said NIR response of said red pixel group, and c) signal processing means coupled to said CCD camera to provide a first output signal representative of the response of said red pixel group and a second signal representative of the response of said at least one of said green or blue pixel groups, comprising means for subtracting said second signal from said first signal to provide an R signal and to provide combinations of said R signal and said second signal to identify objects in said target area.

* * * * *